(12) United States Patent
Glasser et al.

(10) Patent No.: US 7,123,609 B2
(45) Date of Patent: Oct. 17, 2006

(54) MANAGING PACKET-BASED TELEPHONY

(75) Inventors: Daniel S. Glasser, Mercer Island, WA (US); Peter S. Ford, Carnation, WA (US); Jeremy D. Stone, Bellevue, WA (US); Brian R. Daugherty, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 10/154,056

(22) Filed: May 23, 2002

(65) Prior Publication Data

US 2003/0147378 A1 Aug. 7, 2003

Related U.S. Application Data

(60) Provisional application No. 60/350,685, filed on Oct. 22, 2001.

(51) Int. Cl.
*H04L 12/64* (2006.01)
(52) U.S. Cl. .................................. 370/354; 370/420
(58) Field of Classification Search ................ 370/466, 370/351–356, 410, 463, 465
See application file for complete search history.

(56) References Cited

U.S. PATENT DOCUMENTS

| 5,625,678 | A | 4/1997 | Blomfield-Brown | |
| 6,188,676 | B1 | 2/2001 | Pirich | |
| 6,850,968 | B1* | 2/2005 | Pfeffer et al. ............... | 709/206 |
| 7,027,432 | B1* | 4/2006 | Carolan et al. ............. | 370/352 |
| 2005/0197155 | A1* | 9/2005 | Baker et al. ............. | 455/552.1 |
| 2006/0098619 | A1* | 5/2006 | Nix et al. .................... | 370/352 |

FOREIGN PATENT DOCUMENTS

| EP | 0 836 301 A1 | 4/1998 |
| WO | WO 98/00787 A1 | 1/1998 |
| WO | 01/63862 A1 | 8/2001 |

OTHER PUBLICATIONS

Ginzboorg, Philip, "Seven Comments on Charging and Billing", Nov. 2000, pp. 89-92, vol. 43, Issue 11, ACM Press, New York, USA (4 pages).
"Cisco ATA 186 Analog Telephone Adaptor", printed from http://www.cisco.com/warp/public/cc/pd/as/180/186/prodlist/at186_ds.html, Sep. 18, 2001 (8 pages).

(Continued)

*Primary Examiner*—Hassan Kizou
*Assistant Examiner*—Salman Ahmed
(74) *Attorney, Agent, or Firm*—Senniger Powers

(57) ABSTRACT

A system for assisting a user in selecting a packet-based telephony service provider ("PBTSP") from a group of PBTSPs, and in registering the user with the selected PBTSP for outbound and/or inbound calling. The selection of a particular PBTSP may be stored in a database, and this stored information may be used to enable the user to exchange telephone call data with one of the PBTSPs. One preferred system receives data from the user's computer device, determines whether the user is registered with one the PBTSPs and, if so, transmits data to the computer device which enables it to exchange telephone call data with one of the PBTSPs. The system also receives telephone call data from the computer device, accesses contact information for a PBTSP, and transmits the received telephone call data to the PBTSP using the accessed contact information.

24 Claims, 4 Drawing Sheets

OTHER PUBLICATIONS

"Cisco IP Phone 7940", printed from http://www.cisco.com/warp/public/cc/pd/tlhw/prodlit/7940_ds.html, Sep. 18, 2001 (6 pages).

Herlein, Greg, "The OpenPhone Project-Internet Telephony for everyone!", printed from http//delivery.acm.org/10.1145/330000/328154/a2-herlein.html, Sep. 20, 2001 (7 pages).

Jiang, Wenyu, et al., "Towards Junking the PBX: Deploying IP Telephony", International Workshop on Network and Operating System Support for Digital Audio and Video, 11th International Workshop on Network and Operating Systems Support for Digital Audio and Video, 2001, pp. 177-185, ACM Press, New York, USA (9 pages).

Ooi, Wei Tsang and Van Renesse, Robbert, "An Adaptive Protocol for Locating Programmable Media Gateways", International Multimedia Conference on Proceedings of the 8th ACM International Conference, 2000, pp. 137-145, ACM Press, New York, USA (9 pages).

Press, larry, "Net.Speech: Desktop Audio Comes to the Net", Communications of the ACM, Oct. 1995, vol. 38, Issue 10, pp. 25-31, ACM Press, New York, USA (7 pages).

Handley, Mark et al., "The Conference Control Channel Protocol (CCCP): A Scalable Base For Building Conference Control Applications", Applications, Technologies, Architectures, and Protocols for Computer Communication, Proceedings of the Conference on Applications, Technologies, Architectures, and Protocols for Computer Communication, 1995, pp. 275-287, ACM Press, New York, USA (13 pages).

* cited by examiner

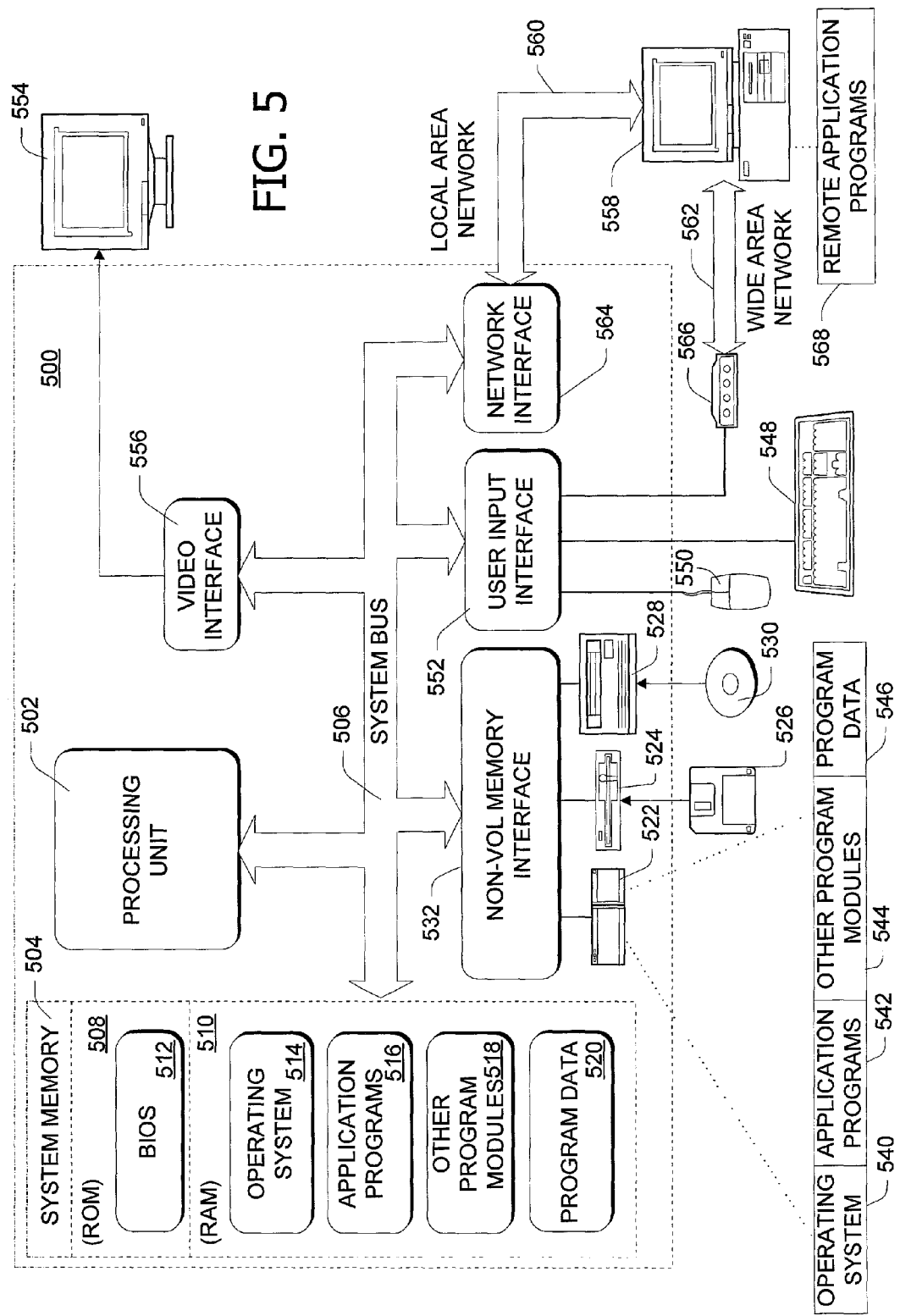

MANAGING PACKET-BASED TELEPHONY

CROSS-REFERENCE TO RELATED APPLICATION

This application claims the benefit of U.S. Provisional Application No. 60/350,685 filed Oct. 22, 2001, the entire disclosure of which is incorporated herein by reference.

FIELD OF THE INVENTION

The present invention relates to packet-based telephony, including Internet and other computer network-based telephony. In particular, the invention relates to managing packet-based telephony services provided to users by one or more packet-based telephony service providers ("PBTSPs")

BACKGROUND OF THE INVENTION

Many on-line service providers seek to provide users with a feature by which the users can place telephone calls from their computer devices, using the computer devices as the equivalent of telephone handsets. Rather than supporting this pc-to-phone functionality directly, an on-line service provider may instead rely on an outside vendor (i.e., a PBTSP) to support this service.

In one known implementation, all packet-based telephony calls initiated by users of an on-line service provider are automatically routed, by client software, directly to an outside PBTSP selected by the service provider. In essence, the on-line service provider represents a referral service for the outside vendor, referring all its users desiring packet-based telephony service to the outside vendor. This implementation suffers from certain disadvantages.

One disadvantage is that users are not provided input into the selection of their PBTSP. Thus, while other available PBTSPs may provide superior service, offer better pricing, etc., the users must nonetheless employ the outside vendor selected by the service provider, or forego the packet-based telephony service.

Another disadvantage relates to the relative inability of the on-line service provider to manage or control the telephony service provided to its users by the outside vendor. This can be particularly problematic where the outside vendor fails to provide users with an appropriate level of service, which may reflect poorly on the referring service provider, or where a contractual relationship between the service provider and the outside vendor terminates.

In view of the above, the inventors have recognized a need for a system which allows service providers to more effectively manage packet-based telephony services provided to their users by outside vendors, and a system which allows users to choose from among multiple PBTSPs.

SUMMARY OF THE INVENTION

One aspect of the present invention is a system for managing and supporting packet-based telephony. The system includes a user database, and an account server for receiving data from a packet-based telephony service provider indicating that a user is registered therewith. The account server also stores data in the user database indicating that the user is registered with the packet-based telephony service provider. The system also includes a configuration server for determining, by accessing the user database, that the user is registered with the packet-based telephony service provider, and for sending data to a computer device associated with the user which enables the computer device to exchange data related to a packet-based telephone call with the packet-based telephony service provider. A proxy server is provided for receiving signaling data for the phone call from the computer device, and for sending the received signaling data to the packet-based telephony service provider.

Another aspect of the invention is a method for assisting a user in selecting a PBTSP from a group of PBTSPs, and in registering the user with the selected PBTSP. Thus, users may select their PBTSPs based on parameters important to them, such as the PBTSPs' reputations, the geographic regions served, the languages supported, pricing, etc. The selection of a particular PBTSP by a user may be stored in a database, and this stored information may indicate that registration of the user with the selected PBTSP is pending. Upon receiving information from the selected PBTSP indicating that the user is registered, the stored information may be modified to indicate that registration of the user with the selected PBTSP has occurred. The stored information may be used to enable (or not enable) the user to exchange telephone call data with one of the PBTSPs.

Yet another aspect of the invention is a method for managing and supporting packet-based telephony service. The method receives data from a computer device associated with a user. The received data relates to a packet-based telephony service for the user. The method determines whether the user is registered with one of multiple PBTSPs and, if so, transmits data to the user's computer device which enables the computer device to exchange telephone call data with one of the multiple PBTSPs.

Still another aspect of the invention is a method for supporting a packet-based telephone call initiated by a user via a computer device. The method receives telephone call data from the computer device through a computer network, accesses from a database contact information for a PBTSP, and transmits the received telephone call data to the PBTSP through a computer network using the accessed contact information.

Additional aspects of the invention include computer-readable media for implementing the systems and methods described herein, and for implementing functions of user computer devices.

While some of the principal features and advantages of the invention have been described above, a greater and more thorough understanding of the invention may be attained by referring to the drawings and the detailed description of preferred embodiments which follow.

BRIEF DESCRIPTION OF THE DRAWINGS

FIG. 5 is a block diagram of an exemplary computer device for use with the present invention.

Corresponding reference characters indicate corresponding features throughout the several views of the drawings.

DETAILED DESCRIPTION OF PREFERRED EMBODIMENTS

Figure 1:
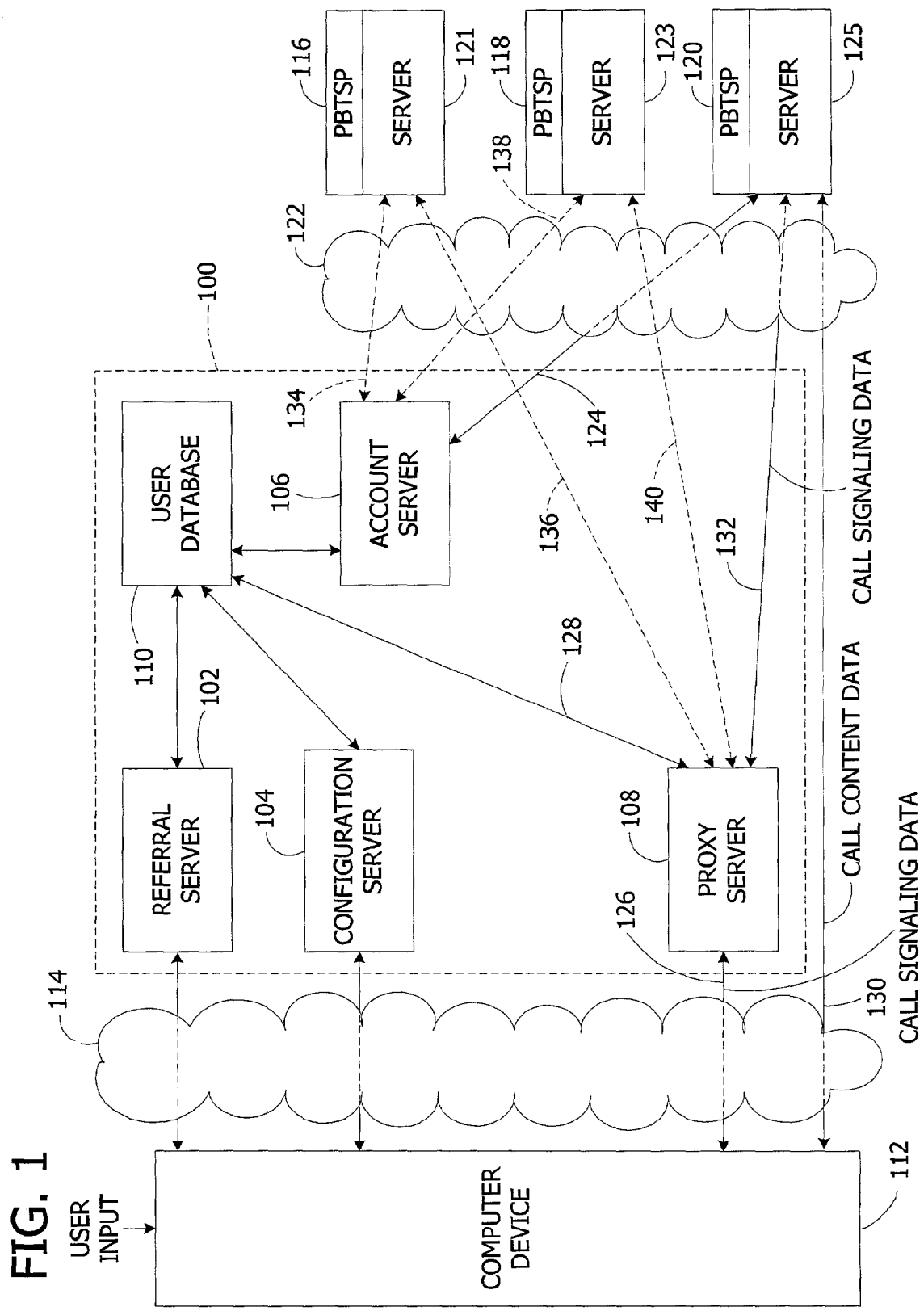
FIG. 1 is a block diagram of a system and a computer device for managing and supporting packet-based telephony according to one embodiment of the present invention.

A system and computer device for managing and supporting packet-based telephony according to one embodiment of the present invention are illustrated in FIG. 1 and indicated generally by reference characters 100 and 112, respectively. As shown in FIG. 1, the system 100 includes a referral server 102, a configuration server 104, an account server 106, a proxy server 108, and a user database 110. As described more fully below, the servers 102–108 exchange data with the user database 110, and with the computer device 112 through a packet-based computer network 114, to manage and support packet-based telephony service for a user associated with the computer device 112. The account server 106 and the proxy server 108 also exchange data with several packet-based telephony service providers ("PBTSPs") 116, 118, 120 through a packet-based computer network 122, as further described below.

The packet-based computer networks 114, 122 shown in FIG. 1 may each (or together) represent a single private or public computer network (including, e.g., a virtual private network), or multiple private and/or public networks. In one embodiment, the packet-based computer network 114 represents a local area network (LAN) connected to the Internet through a gateway, the packet-based computer network 122 represents the Internet, and the PBTSPs 116–120 are Internet telephony service providers.

While only one computer device 112 is shown in FIG. 1, it should be understood that the system 100 may support and exchange data with a large number of such devices so as to manage and support packet-based telephony service for a large number of users. Likewise, although three PBTSPs 116–120 are shown in FIG. 1 for illustrative purposes, it should be understood that the system 100 may be used with a much larger number of PBTSPs, or as few as one PBTSP. The system 100 may also employ servers and databases in addition to those shown illustratively in FIG. 1.

In the particular embodiment under discussion, after the user successfully logs into the system 100, the computer device 112 queries the configuration server 104 to determine whether the user is registered with one of the PBTSPs 116–120. In response, the configuration server accesses a record for the user from the user database 110. If the user's record indicates the user is registered with one of the PBTSPs 116–120, the configuration server transmits data to the computer device 112 which enables the computer device to exchange telephone call data with the user's PBTSP in a manner described below. In the particular embodiment under discussion, the data provided to the computer device 112 enables a telephone dialer user interface in the computer device 112, which the user can then use to place telephone calls. The configuration server 104 may provide the computer device 112 with a set of web browser-style links (e.g., URLs) specific to the user's PBTSP including, for example, a link to a graphical image identifying the user's PBTSP, a link to the user's account information, a link to call status information, etc. If the user is not registered with one of the PBTSPs, the configuration server 104 provides data to the computer device 112 indicative of the user's non-registered status.

Figure 2:
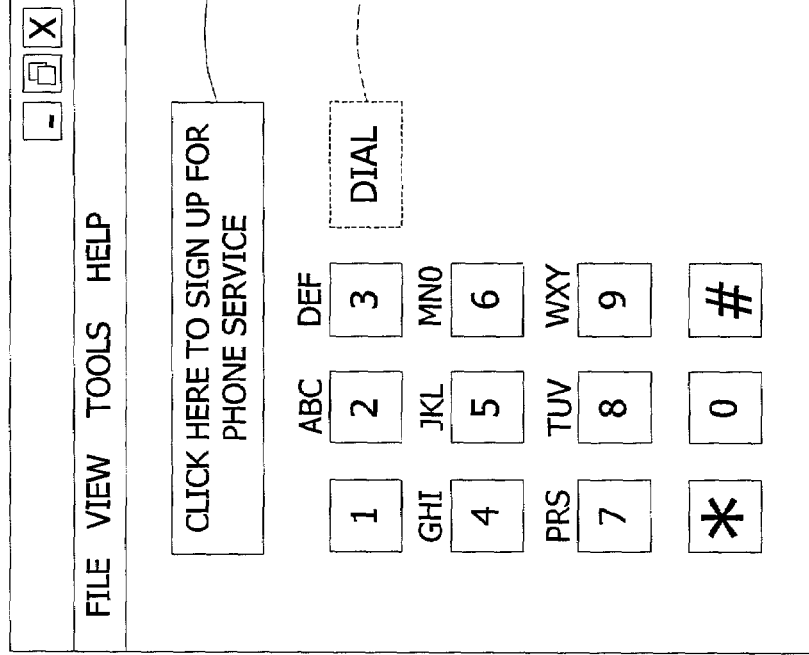
FIG. 2 illustrates a telephone dialer user interface prompting a user to sign up for packet-based telephony service.

When the user indicates a desire to place a telephone call using the computer device 112 (e.g., by selecting a "call" function from a toolbar displayed by the computer device), the computer device 112 displays a telephone dialer user interface. If the user is not yet registered with one of the PBTSPs 116–120, the computer device 112 displays the telephone dialer user interface 202 shown in FIG. 2. The telephone dialer user interface 202 prompts the user to select a sign up button 204 (or, alternatively, a hyperlink) to register for telephone service. Because the user is not yet registered with one of the PBTSPs, the computer device 112 has not yet received data from the configuration server 104 which enables the telephone dialer user interface 202. Accordingly, a dial button 206 on the telephone dialer user interface 202 is disabled, as shown (in phantom) in FIG. 2, thereby preventing the user from placing a telephone call through the computer device 112.

Selecting the sign up button 204 prompts the computer device 112 to open a web browser application and send data to the referral server 102 indicating the user's desire to register for telephone service. In response, the referral server 102 serves a web page 302, shown illustratively in FIG. 3, to the computer device 112. The web page 302 provides a list of the PBTSPs available to the user. The particular PBTSPs listed in the web page 302 may be selected by the system 100 according to previously obtained information about the user, such as the user's geographic region and spoken language. Web page 302 may also allow the user to receive a list of providers in other countries. In any event, providers available to the user may be listed according to a random ordering, according to a weighting scheme (e.g., based on contractual agreements assuring "top billing" to particular service providers), according to a hybrid of these two approaches, or otherwise.

Figure 3:
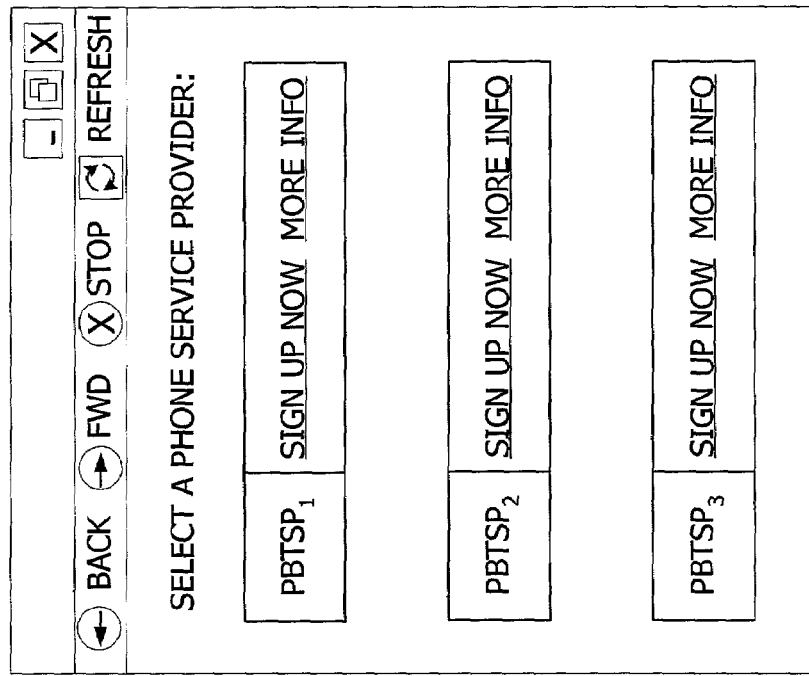
FIG. 3 illustrates a web page prompting a user to select one of multiple packet-based telephony service providers.

If the user selects one of the listed PBTSPs (e.g., by clicking a "sign up now" hyperlink for one of the PBTSPs, as shown in FIG. 3), data indicative of the user's selection is sent by the computer device 112 to the referral server 102.

For purposes of explanation, assume the user selected PBTSP 120 of FIG. 1 from the exemplary web page 302 shown in FIG. 3. In response to receiving data indicative of this selection, the referral server 102 modifies the user's record stored in the user database 110 to indicate that registration of the user with PBTSP 120 is pending. The referral server 102 then assists the user in registering with PBTSP 120. In the particular embodiment under discussion, the referral server 102 directs the web browser application in the computer device 112 to a web site for PBTSP 120, where the user can register on-line with PBTSP 120 for telephony service.

Once the user has completed the on-line signup process, PBTSP 120 sends data to the account server 106 indicating that the user has registered therewith. In response, the account server 106 accesses the user database 110 to confirm that registration of the user with PBTSP 120 was pending. If the account server 106 is unable to confirm this, the account server 106 will send a failure message to PBTSP 120. In response, PBTSP 120 may advise the user that it was unable to successfully register the user for service, and may also prompt the user to contact an administrator of the system 100 for further assistance. If the account server does confirm that registration of the user with PBTSP 120 was pending, the account server 106 updates the user's record in the user database 110 to indicate that the user's status with PBTSP 120 has changed from pending to registered. The account server 106 also sends a success message to PBTSP 120. These communications between the account server 106 and PBTSP 120 are represented by arrow 124 in FIG. 1. Upon receiving the success message, PBTSP 120 may advise the user that it has successfully registered for telephony service, and may also advise the user when such service will be activated, if not immediately.

Although the system 100 has been described above as assisting the user in registering with a single service provider, it may also be configured to assist the user in registering with multiple service providers, if desired.

Once registered, when the user indicates a desire to place a telephone call through the computer device 112, the computer device 112 queries the configuration server 104 to determine whether the user is registered with one of the PBTSPs 116–120 (unless this process has already occurred, such as when the user logged into the system 100). In response, the configuration server 104 accesses the user's record from the user database 110 which indicates, in this example, that the user is registered with PBTSP 120. The configuration server 104 therefore provides data to the computer device 112 which enables the computer device to display the telephone dialer user interface 402 illustrated in FIG. 4. As shown therein, the interface 402 includes a graphical image 404 (e.g., a corporate logo) identifying PBTSP 120, and a hyperlink 406 to the user's account information. In the case where the user is registered with multiple service providers, the telephone dialer interface may prompt the user to indicate which of the user's PBTSPs should be used to service a particular call.

Figure 4:
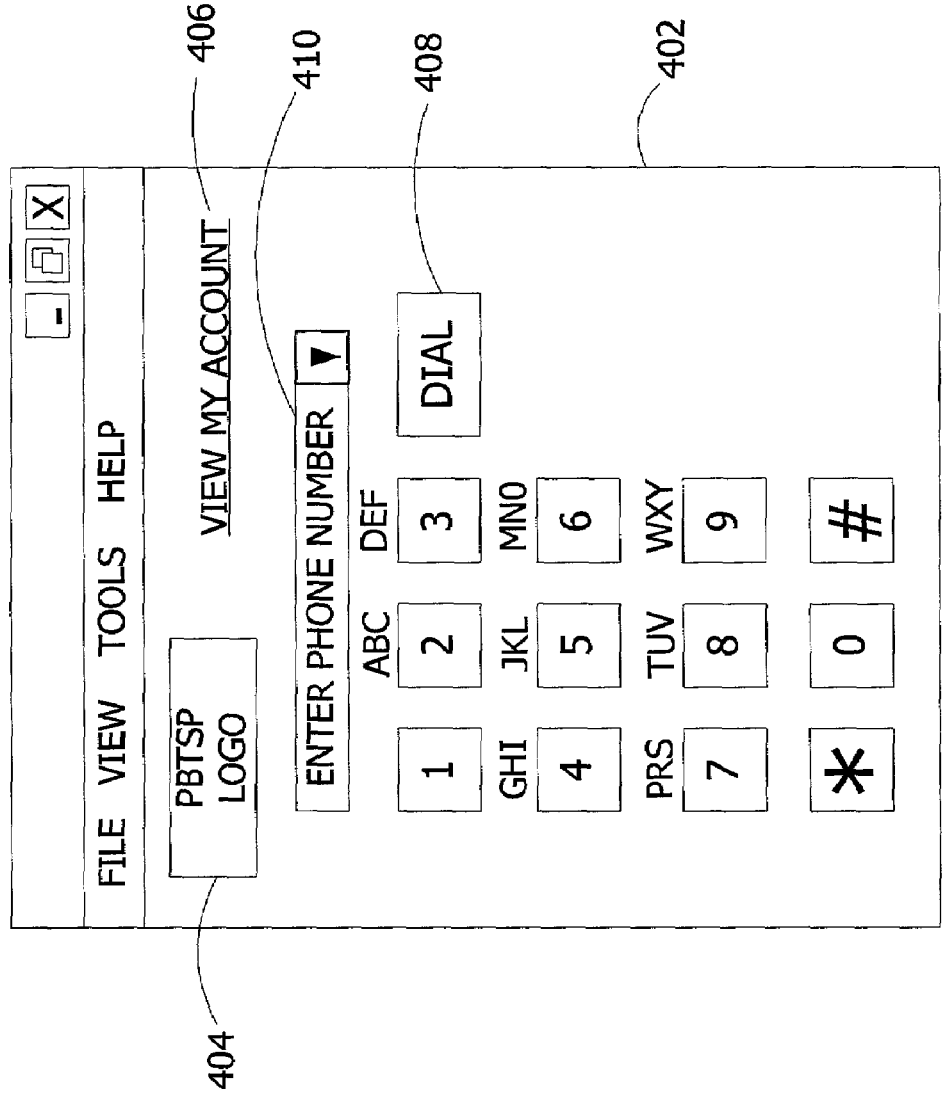
FIG. 4 illustrates a telephone dialer user interface enabled by the system of FIG. 1.

Via the interface 402 shown in FIG. 4, the user can place a telephone call by selecting the dial button 408 after entering a telephone number in field 410. The "telephone number" entered by the user in field 410 may be any string of alphanumeric characters for addressing a telephone device through a computer network and/or a Public Switched Telephone Network ("PSTN"), including but not limited to a 10-digit telephone number following the convention used in North America.

In response to the user selecting the dial button 408 after entering a telephone number in field 410, the computer device 112 sends signaling data for the telephone call to the proxy server 108, as indicated by arrow 126 in FIG. 1. Upon receiving the call signaling data, the proxy server 108 accesses the user database 110 to retrieve contact information for the user's PBTSP (e.g., an IP address for, in this example, a server 125 associated with the PBTSP 120), as indicated by arrow 128 in FIG. 1. The proxy server 108 then forwards the signaling data to PBTSP 120, as indicated by arrow 132 in FIG. 1, using the retrieved contact information. Alternatively, the contact information used by the proxy server 108 to forward the signaling data may first be retrieved from the user database 110 by the configuration server 104, provided to the computer device 112 by the configuration server 104 (e.g., along with or as the data which enables the telephone dialer user interface), and then provided by the computer device 112 to the proxy server 108 along with the signaling data. This alternative approach (which would not require arrow 128 of FIG. 1) would allow the proxy server 108 to immediately forward the signaling data to the user's PBTSP without first having to access the contact information from the user database 110, which could potentially create latency issues.

It should be noted that by requiring input from the user prior to registering the user with a PBTSP, and then routing call signaling data only to a PBTSP with which the user is registered, the system 100 prevents "slamming" of the user. That is, it protects the user from becoming registered with or serviced by a PBTSP without the user's knowledge or consent.

While the call signaling data is routed from the computer device 112 to the system 100 for forwarding to PBTSP 120, as explained above, the computer device 112 sends call content data (e.g., media traffic) to PBTSP 120 directly, as indicated by arrow 130 in FIG. 1. In one embodiment, this is done using contact information for PBTSP 120 (e.g., the IP address for server 125) provided to the computer device 112 by the proxy server 108 in response to receiving the signaling data.

Although the PBTSPs 116, 118, 120 are shown in FIG. 1 as having one associated server 121, 123, 125, respectively, it should be understood that each PBTSP may employ multiple servers, including one or more servers for handling call signaling data and one or more additional servers for handling call content data. Thus, the contact information provided to the computer device 112 for routing the call content data may differ from the contact information used by the proxy server 108 for routing the call signaling data.

Depending on whether the telephone number entered by the user in field 410 of FIG. 4 maps to a conventional telephone device, PBTSP 120 will route the received signaling data and call content data to a gateway to a PSTN, or through an appropriate computer network to which the telephone device being called is connected. Thus, it should be understood that the computer device 112 may be used to call virtually any type of telephone device, including conventional telephone devices, computer devices capable of receiving packet-based telephone calls over a computer network, etc.

In the specific embodiment under discussion, the protocol used between the computer device 112 and the configuration server 104, and between the PBTSPs and the account server 106, is a Hypertext Transfer Protocol ("HTTP"). The protocol used between the computer device 112 and the referral server 102 is HTTP. The protocols used to transmit the call signaling data and the call content data are Session Initiation Protocol ("SIP") and Real Time Protocol ("RTP"), respectively. As should be apparent, however, other suitable protocols may be used without departing from the scope of the invention.

In FIG. 1, arrows 134–140 (shown in phantom) represent communications between the system 100, PBTSP 116, and PBTSP 118 to manage and support packet-based telephony for users registered with PBTSP 116 and PBTSP 118.

While the system 100 and the computer device 112 have been described above in the context of an outbound call placed by a user through the computer device 112, the user may likewise receive incoming telephone calls through the computer device 112. For example, as part of registering with the PBTSP 120, the PBTSP 120 may provision a telephone number to the user for receiving telephone calls, and store contact information (e.g., a DNS name) for the user's proxy server 108. Thereafter, when the PBTSP 120 receives a telephone call placed to the user's telephone number, the PBTSP 120 attempts to complete the call with the computer device 112 by routing signaling data for the incoming call to the proxy server 108. In response, the proxy server 108 accesses the user database 110 to confirm that the user is registered with the PBTSP 120 (as well as, in one embodiment, to map the provisioned telephone number to a device associated with the user, such as computer device 112). If so, the proxy server 108 can attempt to forward the received signaling data to the computer device 112. If the signaling data is received by the computer device 112, the computer device presents an incoming call user interface (not shown) to the user. If the user is present at the computer device and chooses to accept the call via the incoming call user interface, the computer device 112 sends an appropriate acknowledgement (e.g., an SIP acknowledgement) to the proxy server 108, which then forwards the acknowledgement to the PBTSP 120 together with contact information (e.g., an IP address) for the computer device 112. The PBTSP 120 then completes the call by sending the call content data (i.e., media traffic) to the computer device 112 directly using the contact information for the computer device 112 received from the proxy server 108.

Rather than choosing to accept the call via the incoming call user interface, the user may type in a telephone number (or select from a drop list, a directory of telephone numbers, etc.) to which the incoming call should be routed. In response, the computer device 112 transmits appropriate signaling (i.e., call forwarding) information to the PBTSP 120 via the proxy server 108. The PBTSP 120 then forwards the incoming call to the telephone number specified by the user.

In one embodiment, the proxy server 108 is configured to monitor the user's presence on the computer device 112 (and/or on the computer network 114). For example, when the user logs on to the computer device 112, the computer device sends a "register" message to the proxy server, indicating the user is now present on the computer device 112. Thereafter, the computer device periodically (e.g., every ten minutes) sends messages to the proxy server 108 to refresh that registration while the user remains present on the computer device 112. If the proxy server 108 does not receive such a message from the computer device for a predefined amount of time, the proxy server interprets this as an indication that the user is no longer present on the computer device 112 (and/or on the computer network 114). The proxy server 108 uses this presence information to determine how to respond upon receiving call signaling data on behalf of the user from the user's PBTSP 120. If the user has a presence on the computer device 112 when signaling data for an incoming call is received by the proxy server 108, the proxy server forwards the signaling data to the computer device 112, and the computer device 112 responds by displaying the incoming call user interface. The user may then accept the call or choose to forward the call to another device, as explained above. If the user does not respond in a timely manner via the incoming call user interface, or if the user responds by choosing not to accept the call, or if the user does not have a presence on the computer device 112 when signaling data for an incoming call is received by the proxy server 108, the proxy server 108 sends information signaling the user's unavailability to the PBTSP 120. In response, the PBTSP 120 may itself accept the incoming call and advise the caller (e.g., using a prerecorded or synthesized speech message) that the user is presently unavailable. Alternatively, the proxy server 108 can send signaling information to the PBTSP 120 which directs the PBTSP 120 to forward the incoming call to another device, such as the user's mobile phone, a voice mail system, etc., according to predefined rules or user selections.

FIG. 5 shows one example of a general purpose computing device in the form of a computer 500. In one embodiment of the invention, a computer such as the computer 500 is suitable for use as any of the servers 102–108 and/or the computer device 112 shown in FIG. 1. However, it should be understood that the computer device 112 need not be a conventional personal computer, and may be any device having voice-capability and configured to communicate with a packet-switched network using packet-switching protocols, including IP phones, handheld devices, mobile phones, mini-browsers, and the like. Further, it should be understood that a user can use the same service configuration on multiple devices, thereby implementing a form of user roaming. In other words, because the user's settings are stored in the system 100, these settings can be used by the user to place calls from any suitable computer device 112 accessible to the user at a given time. Conversely, multiple users can use a single computer device (one at a time), and their corresponding settings stored in the system 100, to place packet-based telephone calls according to the present invention.

A single computer (such as computer 500 of FIG. 5) having one or more processors may also be used to implement several of the servers 102–108 shown in FIG. 1, as should be apparent.

As illustrated in FIG. 5, computer 500 has one or more processors or processing units 502 and a system memory 504. A system bus 506 couples various system components including the system memory 504 to the processors 502. The bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically has at least some form of computer readable media. Computer readable media, which include both volatile and nonvolatile media, removable and non-removable media, may be any available medium that can be accessed by computer 500. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 500. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 504 includes computer storage media in the form of removable and/or non-removable, volatile and/or nonvolatile memory. In the exemplary computer 500 illustrated in FIG. 5, system memory 504 includes read only memory (ROM) 508 and random access memory (RAM) 510. A basic input/output system 512 (BIOS), containing the basic routines that help to transfer information between elements within computer 500, such as during startup, is typically stored in ROM 508. RAM 510 typically contains data and/or program modules that are immediately accessible to and/or presently being operated on by processing unit 502. By way of example, and not limitation, FIG. 5 illustrates operating system 514, application programs 516, other program modules 518, and program data 520.

The computer 500 may also include other removable/non-removable, volatile/nonvolatile computer storage media. For example, FIG. 5 illustrates a hard disk drive 522 that reads from or writes to non-removable, nonvolatile magnetic media. FIG. 5 also shows a magnetic disk drive 524 that reads from or writes to a removable, nonvolatile magnetic disk 526, and an optical disk drive 528 that reads from or writes to a removable, nonvolatile optical disk 530 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 522, and magnetic disk drive 524 and optical disk drive 528 are typically connected to the system bus 506 by a non-volatile memory interface, such as interface 532.

The drives or other mass storage devices and their associated computer storage media discussed above and illustrated in FIG. 5, provide storage of computer readable instructions, data structures, program modules and other data for the computer 500. In FIG. 5, for example, hard disk drive 522 is illustrated as storing operating system 540, application programs 542, other program modules 544, and program data 546. Note that these components can either be the same as or different from operating system 514, application programs 516, other program modules 518, and program data 520. Operating system 540, application programs 542, other program modules 544, and program data 546 are given different numbers here to illustrate that, at a minimum, they are different copies.

A user may enter commands and information into computer 500 through input devices such as a keyboard 548 and a pointing device 550 (e.g., a mouse, trackball, pen, or touch pad). Other input devices (not shown) may include a microphone, joystick, game pad, satellite dish, scanner, or the like. These and other input devices are connected to processing unit 502 through a user input interface 552 that is coupled to system bus 506, but may be connected by other interface and bus structures, such as a parallel port, game port, or a universal serial bus (USB). A monitor 544 or other type of display device is also connected to system bus 506 via an interface, such as a video interface 556. In addition to the monitor 554, computers often include other peripheral output devices (not shown) such as a printer and speakers, which may be connected through an output peripheral interface (not shown).

The computer 500 may operate in a networked environment using logical connections to one or more remote computers, such as a remote computer 558. The remote computer 558 may be a personal computer, a server, a router, a network PC, a peer device or other common network node, and typically includes many or all of the elements described above relative to computer 500. The logical connections depicted in FIG. 5 include a local area network (LAN) 560 and a wide area network (WAN) 562, but may also include other networks. Such networking environments are commonplace in offices, enterprise-wide computer networks, intranets, and global computer networks (e.g., the Internet).

When used in a local area networking environment, computer 500 is connected to the LAN 560 through a network interface or adapter 564. When used in a wide area networking environment, computer 500 typically includes a modem 566 or other means for establishing communications over the WAN 562, such as the Internet. The modem 566, which may be internal or external, is connected to system bus 506 via the user input interface 552, or other appropriate mechanism. In a networked environment, program modules depicted relative to computer 500, or portions thereof, may be stored in a remote memory storage device (not shown). By way of example, and not limitation, FIG. 5 illustrates remote application programs 568 as residing on the memory device. It will be appreciated that the network connections shown are exemplary and other means of establishing a communications link between the computers may be used.

Generally, the data processors of computer 500 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the functions described above in conjunction with a microprocessor or other data processor. The invention also includes the computer itself when programmed according to the methods and techniques described herein.

For purposes of illustration, programs and other executable program components, such as the operating system, are illustrated in FIG. 5 as discrete blocks. It is recognized, however, that such programs and components reside at various times in different storage components of the computer, and are executed by the data processor(s) of the computer.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed:

1. A system for managing and supporting packet-based telephony, the system comprising:
  a user database;
  an account server for receiving data from a packet-based telephony service provider indicating that a user is registered therewith, and for storing data in the user database indicating that the user is registered with the packet-based telephony service provider;
  a configuration server for determining, by accessing the user database, that the user is registered with the packet-based telephony service provider, and for sending data to a computer device associated with the user which enables the computer device to exchange data related to a packet-based telephone call with the packet-based telephony service provider;
  a proxy server for receiving signaling data for the packet-based telephone call from the computer device, and for sending the received signaling data to the packet-based telephony service provider; and
  a referral server for sending to the computer device a list of a plurality of packet-based telephony service providers, the plurality including said packet-based telephony service provider, for receiving from the computer device a selection by the user of said packet-based telephony service provider, and for storing data in the user database indicative of the selection by the user, said referral server being configured for storing data in the user database indicating that registration of the user with said packet-based telephony service provider is pending, and said account server being configured for, in response to receiving said data from the packet-based telephony service provider indicating that the user is registered therewith, modifying data stored in the user database to indicate that registration of the user with said packet-based telephony service provider has occurred.

2. The system of claim 1 wherein the proxy server is configured for sending the received signaling data to the packet-based telephony service provider using contact information for the packet-based telephony service provider stored in the user database.

3. The system of claim 1 wherein the proxy server is configured for receiving from the packet-based telephony service provider signaling data for a packet-based telephone call to the user, and for sending the signaling data received from the packet-based telephony service provider to the computer device.

4. The system of claim 3 wherein the proxy server is configured to access the user database and confirm that the user is registered with the packet-based telephony service provider prior to sending the signaling data received from the packet-based telephony service provider to the computer device.

5. The system of claim 3 wherein the proxy server is configured to determine whether the user has a presence on the computer device prior to sending the signaling data received from the packet-based telephony service provider to the computer device.

6. The system of claim 3 wherein the proxy server is configured to send contact information for the computer device to the packet-based telephony service provider, thereby enabling the packet-based telephony service provider to send directly to the computer device call content data for the packet-based telephone call to the user.

7. A system for managing and supporting packet-based telephony, the system comprising:
 a user database;
 an account server for receiving data from a packet-based telephony service provider indicating that a user is registered therewith, and for storing data in the user database indicating that the user is registered with the packet-based telephony service provider;
 a configuration server for determining, by accessing the user database, that the user is registered with the packet-based telephony service provider, and for sending data to a computer device associated with the user which enables the computer device to exchange data related to a packet-based telephone call with the packet-based telephony service provider; and
 a proxy server for receiving signaling data for the packet-based telephone call from the computer device, and for sending the received signaling data to the packet-based telephony service provider, said proxy server being configured for receiving from the packet-based telephony service provider signaling data for a packet-based telephone call to the user, and for sending the signaling data received from the packet-based telephony service provider to the computer device, said proxy server being further configured to access the user database and confirm that the user is registered with the packet-based telephony service provider prior to sending the signaling data received from the packet-based telephony service provider to the computer device.

8. The system of claim 7 further comprising a referral server for sending to the computer device a list of a plurality of packet-based telephony service providers, the plurality including said packet-based telephony service provider, for receiving from the computer device a selection by the user of said packet-based telephony service provider, and for storing data in the user database indicative of the selection by the user.

9. The system of claim 8 wherein the referral server is configured for storing data in the user database indicating that registration of the user with said packet-based telephony service provider is pending, and wherein the account server is configured for, in response to receiving said data from the packet-based telephony service provider indicating that the user is registered therewith, modifying data stored in the user database to indicate that registration of the user with said packet-based telephony service provider has occurred.

10. The system of claim 7 wherein the proxy server is configured for sending the received signaling data to the packet-based telephony service provider using contact information for the packet-based telephony service provider stored in the user database.

11. The system of claim 7 wherein the proxy server is configured to determine whether the user has a presence on the computer device prior to sending the signaling data received from the packet-based telephony service provider to the computer device.

12. The system of claim 7 wherein the proxy server is configured to send contact information for the computer device to the packet-based telephony service provider, thereby enabling the packet-based telephony service provider to send directly to the computer device call content data for the packet-based telephone call to the user.

13. A system for managing and supporting packet-based telephony, the system comprising:
 a user database;
 an account server for receiving data from a packet-based telephony service provider indicating that a user is registered therewith, and for storing data in the user database indicating that the user is registered with the packet-based telephony service provider;
 a configuration server for determining, by accessing the user database, that the user is registered with the packet-based telephony service provider, and for sending data to a computer device associated with the user which enables the computer device to exchange data related to a packet-based telephone call with the packet-based telephony service provider; and
 a proxy server for receiving signaling data for the packet-based telephone call from the computer device, and for sending the received signaling data to the packet-based telephony service provider, said proxy server being configured for receiving from the packet-based telephony service provider signaling data for a packet-based telephone call to the user, and for sending the signaling data received from the packet-based telephony service provider to the computer device, said proxy server being further configured to determine whether the user has a presence on the computer device prior to sending the signaling data received from the packet-based telephony service provider to the computer device.

14. The system of claim 13 further comprising a referral server for sending to the computer device a list of a plurality of packet-based telephony service providers, the plurality including said packet-based telephony service provider, for receiving from the computer device a selection by the user of said packet-based telephony service provider, and for storing data in the user database indicative of the selection by the user.

15. The system of claim 13 wherein the referral server is configured for storing data in the user database indicating that registration of the user with said packet-based telephony service provider is pending, and wherein the account server is configured for, in response to receiving said data from the packet-based telephony service provider indicating that the user is registered therewith, modifying data stored in the user database to indicate that registration of the user with said packet-based telephony service provider has occurred.

16. The system of claim 13 wherein the proxy server is configured for sending the received signaling data to the packet-based telephony service provider using contact information for the packet-based telephony service provider stored in the user database.

17. The system of claim 13 wherein the proxy server is configured to access the user database and confirm that the user is registered with the packet-based telephony service provider prior to sending the signaling data received from the packet-based telephony service provider to the computer device.

18. The system of claim 13 wherein the proxy server is configured to send contact information for the computer device to the packet-based telephony service provider, thereby enabling the packet-based telephony service provider to send directly to the computer device call content data for the packet-based telephone call to the user.

19. A system for managing and supporting packet-based telephony, the system comprising:
a user database;
an account server for receiving data from a packet-based telephony service provider indicating that a user is registered therewith, and for storing data in the user database indicating that the user is registered with the packet-based telephony service provider;
a configuration server for determining, by accessing the user database, that the user is registered with the packet-based telephony service provider, and for sending data to a computer device associated with the user which enables the computer device to exchange data related to a packet-based telephone call with the packet-based telephony service provider; and
a proxy server for receiving signaling data for the packet-based telephone call from the computer device, and for sending the received signaling data to the packet-based telephony service provider, said proxy server being configured for receiving from the packet-based telephony service provider signaling data for a packet-based telephone call to the user, and for sending the signaling data received from the packet-based telephony service provider to the computer device, said proxy server being further configured to send contact information for the computer device to the packet-based telephony service provider, thereby enabling the packet-based telephony service provider to send directly to the computer device call content data for the packet-based telephone call to the user.

20. The system of claim 19 further comprising a referral server for sending to the computer device a list of a plurality of packet-based telephony service providers, the plurality including said packet-based telephony service provider, for receiving from the computer device a selection by the user of said packet-based telephony service provider, and for storing data in the user database indicative of the selection by the user.

21. The system of claim 20 wherein the referral server is configured for storing data in the user database indicating that registration of the user with said packet-based telephony service provider is pending, and wherein the account server is configured for, in response to receiving said data from the packet-based telephony service provider indicating that the user is registered therewith, modifying data stored in the user database to indicate that registration of the user with said packet-based telephony service provider has occurred.

22. The system of claim 19 wherein the proxy server is configured for sending the received signaling data to the packet-based telephony service provider using contact information for the packet-based telephony service provider stored in the user database.

23. The system of claim 19 wherein the proxy server is configured to access the user database and confirm that the user is registered with the packet-based telephony service provider prior to sending the signaling data received from the packet-based telephony service provider to the computer device.

24. The system of claim 19 wherein the proxy server is configured to determine whether the user has a presence on the computer device prior to sending the signaling data received from the packet-based telephony service provider to the computer device.

* * * * *